United States Patent [19]

Ziegenhain et al.

[11] E Re. 29,605

[45] Reissued Apr. 4, 1978

[54] HIGH-POROSITY, HIGH-SURFACE AREA, LOW-BULK DENSITY ALUMINA

[75] Inventors: William C. Ziegenhain; John H. Smith, both of Ponca City, Okla.

[73] Assignee: Continental Oil Company, Ponca City, Okla.

[21] Appl. No.: 690,766

[22] Filed: May 10, 1976

Related U.S. Patent Documents

Reissue of:

[64] Patent No.: 3,907,512
Issued: Sep. 23, 1975
Appl. No.: 439,679
Filed: Feb. 4, 1974

U.S. Applications:

[63] Continuation-in-part of Ser. No. 218,882, Jan. 19, 1972, abandoned.

[51] Int. Cl.[2] ..... C01F 7/02; B01J 11/58

[52] U.S. Cl. ..... 23/293 A; 23/305 A; 34/22; 252/463; 423/628

[58] Field of Search ..... 423/628, 625, 630; 23/293 A, 305 A; 34/22, 30; 252/463; 159/16 R, 16 S; 260/632 A

[56] References Cited

U.S. PATENT DOCUMENTS

| | | | |
|---|---|---|---|
| 2,859,185 | 11/1958 | Kimberlin | 23/305 A |
| 2,970,892 | 2/1961 | Kirshenbaum | 23/305 A |
| 2,991,256 | 7/1961 | Hauel | 423/628 |
| 3,268,295 | 8/1966 | Armbrust | 23/305 A |
| 3,343,915 | 9/1967 | Rossi | 423/625 |
| 3,382,040 | 5/1968 | Fuderer | 23/305 A |
| 3,394,990 | 7/1968 | Weingaertner | 23/305 A |

OTHER PUBLICATIONS

Krczil, Aktive Tonerde, 1938, pp. 48 and 49.

*Primary Examiner*—Stephen J. Emery
*Attorney, Agent, or Firm*—Cortlan R. Schupbach, Jr.

[57] ABSTRACT

A method for producing high-porosity, high-surface area, low-bulk density alumina by drying aqueous alumina mixtures with an alkanol vapor. The alumina product after drying has a surface area from about 260 to 400 $m^2/g$, a pore volume from about 1.0 to about 2.75 cc/g, and a loose-bulk density from about 7.5 to about 25 $lb/ft^3$. The alkanol vapor is selected from the vapors of alkanols containing from about 1 to about 8 carbon atoms.

5 Claims, 1 Drawing Figure

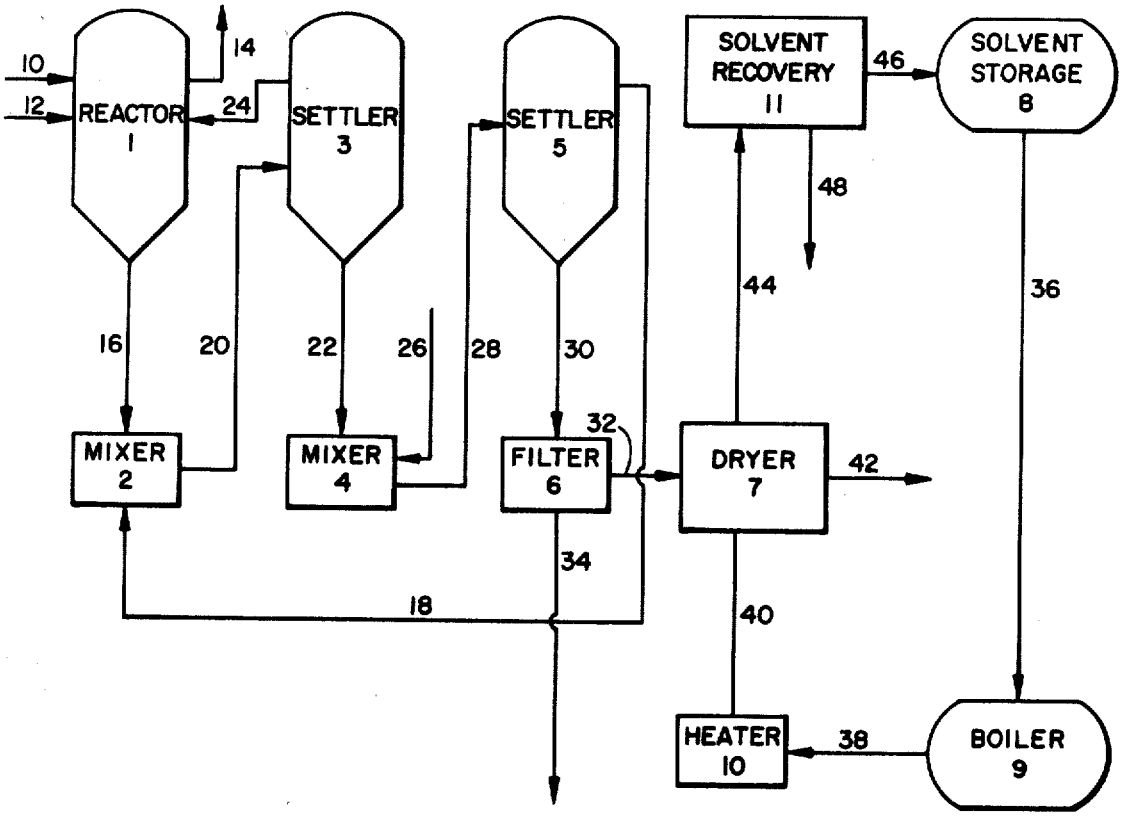
10
12
REACTOR
1
14
24
SETTLER
3
SETTLER
5
SOLVENT
RECOVERY
11
46
SOLVENT
STORAGE
8
48
44
36
16
20
22
26
28
30
32
MIXER
2
MIXER
4
FILTER
6
DRYER
7
42
34
18
40
HEATER
10
38
BOILER
9

HIGH-POROSITY, HIGH-SURFACE AREA, LOW-BULK DENSITY ALUMINA

Matter enclosed in heavy brackets [ ] appears in the original patent but forms no part of this reissue specification; matter printed in italics indicates the additions made by reissue.

BACKGROUND OF THE INVENTION

This application is a continuation-in-part of our earlier filed application Ser. No. 218,882 of the same title filed Jan. 19, 1972, now abandoned.

FIELD OF THE INVENTION

This invention relates to a method for producing low-density, high-porosity, high-surface area alumina. The invention further relates to a method for producing such alumina by contacting aqueous alumina mixtures with alkanol vapors.

PRIOR ART

Numerous processes such as the water hydrolysis of aluminum alkoxides, the alum process, and sodium aluminate processes are known for the production of alumina. Such alumina has a variety of uses, such as for catalysts, catalyst supports, and the like. In many of these applications the usefulness of the alumina is directly related to its pore volume, surface area, and density. Generally, lighter alumina having low-bulk density, high-surface area, and high porosity is more desirable for such uses. Most processes known heretofore produce alumina having loose-bulk densities greater than 35 lb/ft$^3$, pore volumes of less than 1.0 cc/g, and surface areas lower than 275 m$^2$/g. Some processes have produced lighter alumina having a high pore volume, but a large proportion of such pore volume is often in the form of macropores having a pore diameter greater than 10,000 A and is of little value for catalytic purposes. Articles by Kistler, S. S., Journal of Physical Chemistry, 36, 52 (1932), and by Johnson, M. F. L., and Mooi, J., Journal of Catalysis, 10, 342–354 (1968), present theoretical discussions of aerogel alumina formation and the production of low-density alumina aerogels by the use of a methanol treatment. Alumina having a pore volume of approximately 0.4 cc/g is shown. The articles do not discuss solvents other than methanol, nor do they suggest that higher pore volumes are attainable by the use of other solvents or solvent vapors.

German Pat. No. 1,230,410, 1,191,353, and 1,170,388 disclose the concept of removing alcoholic reaction products from alumina filtercake produced by water hydrolysis of aluminum alkoxides. The alcoholic reaction product is removed by contacting the alumina filtercake with an organic solvent. These references are directed to the removal of organic contaminants and do not show that a low-density alumina product is obtained. In German Pat. No. 1,191,353 solvents such as hydrocarbons and low molecular weight alcohols are shown. The low molecular weight alcohols include materials suitable for use in the process of the present invention, but there is no suggestion that the additional processing steps necessary to produce low-bulk density, high-porosity, high-surface area alumina would be useful or desirable.

U.S. Pat. No. 3,394,990 issued to Weingartner, July 30, 1968, shows a process for the hydrolysis of aluminum alkoxides including washing the alumina filtercake with butanol. There is no indication that the butanol wash will result in lighter alumina, and the primary objecting noted is the removal of organic reaction products, reactants, and the like from the alumina filtercake.

U.S. Pat. No. 3,577,353, issued May 4, 1971, to White, is also considered pertinent to this discussion.

In U.S. Ser. No. 191,085 entitled "High-Porosity, High-Surface Area, Low-Bulk Density Alumina" filed Oct. 20, 1971, by W. C. Ziegenhain, it is shown that desirable alumina is produced by forming a mixture of organic solvents and aqueous alumina and drying the mixture to produce desirable alumina. There is no suggestion that solvent vapors could be used to dry aqueous alumina mixtures to produce desirable alumina products.

As noted above, low-density alumina having a high porosity and a high-surface area in many applications, such as catalysts, catalytic coatings, and the like. Accordingly, much effort has been devoted to developing methods for producing a low-density alumina.

OBJECTS OF THE INVENTION

It is an object of this invention to provide a method for the production of alumina having a loose-bulk density less than about 35 lb/ft$^3$, a pore volume (0–10,000A) greater than about 1.0 cc/g, and a surface area greater than about 275 m$^2$/g. A further object of this invention is a simplified method for producing such alumina from aqueous alumina mixtures. A further objective of this invention is a method for producing such alumina by contacting aqueous alumina mixtures with alkanol vapors.

SUMMARY OF THE INVENTION

It has now been found that the objectives of the present invention are accomplished by a process comprising:

a. contacting aqueous alumina mixtures with an effective amount of alkanol vapors wherein the alkanols contain from about 1 to about 8 carbon atoms;

b. recovering alumina having a pore volume from about 1.0 to about 2.75 cc/g, a loose-bulk density from about 7.5 to about 25 lb/ft$^3$, and a surface area from about 260 to about 400 m$^2$/g.

BRIEF DESCRIPTION OF THE DRAWING

The FIGURE is a flow diagram showing a typical embodiment of the present invention.

DESCRIPTION OF THE INVENTION

Alumina is useful for a variety of catalytic and refractory applications. The alumina produced by the method of the present invention is useful for a variety of uses, such as chemical process catalysts and catalyst supports, catalyst linings for automotive mufflers, and the like. In many of these uses it will be desirable to add catalystic materials, such as metallic ions, finely-divided metals, cations, and the like, to the alumina. Such additions can be achieved by mixing the catalytic materials with the alumina during the production of the alumina, during the preparation of extrudates or pellets and the like, by coating alumina particles, such as extrudates or pellets, with catalytic material by immersion in solutions containing the catalytic material and the like. Other and additional methods of modifying the alumina may appear obvious or desirable to those skilled in the art.

Alumina useful in catalytic applications has been produced heretofore by a variety of processes, such as the water hydrolysis of aluminum alkoxides, precipitation of alumina from alum, sodium aluminate processes, and the like. Generally speaking, such alumina, while useful for catalytic uses, has not been as desirable as the alumina produced by the method of the present invention. Desirable alumina has been produced by a method comprising contacting aqueous alumina mixtures with solvents to form a solvent-aqueous alumina mixture followed by drying to produce desirable alumina. Such alumina is similar to the alumina produced by the process of the present invention. The present invention relates to an improved method for producing such alumina by the use of solvent vapor to remove water from aqueous alumina mixtures, thus producing high-quality alumina without the difficulty of adjusting the solution composition to an azeotropic mixture, the difficulty of handling solvent-aqueous alumina mixtures and the like.

The aqueous alumina mixtures suitable for use in the method of the present invention are those containing up to about 32 weight percent alumina as $Al_2O_3$ wherein said alumina has not previously been dried subsequent to its production from the raw materials used, i.e., aluminum alkoxides, alum, alkali metal aluminates, and the like. Some dispersible aluminas when redispersed and treated according to the method of the present invention show improvements in desirable properties but are not substantially improved by comparison to comparable alumina which has not been previously dried. It has been found that aqueous-alumina mixtures can be concentrated by drying and the like to about 32 weight percent $Al_2O_3$ prior to treatment by the method of the present invention without substantial losses in the desirable product parameters. Above about 32 weight percent $Al_2O_3$, losses in product quality were apparent. Preferred compositions are from about 12 to about 22 weight percent $Al_2O_3$.

In a typical embodiment of the present invention shown in the FIGURE, a mixture of aluminum alkoxides produced by the Ziegler process and containing from 1 to about 30 carbon atoms in each alkoxide group is charged to reactor 1 through line 10. Water is charged to reactor 1 through line 12, and the reaction products, i.e., alcohols and an aqueous-alumina portion, are withdrawn through lines 14 and 16, respectively. A butanol-water stream is charged to reactor 1 from settler 3 through line 24 and comprises a portion of the total water charged to reactor 1. The aqueous-alumina portion is withdrawn through line 16 and passed to mixer 2 where it is mixed with a butanol-water stream which is passed from settler 5 to mixer 2 through line 18. The mixed, aqueous-alumina portion and solvent are passed from mixer 2 to settler 3 by way of line 20 and allowed to separate. The butanol-water portion is removed from settler 3 and passed to reactor 1 through line 24. The alumina-water portion is withdrawn through line 22 and passed to mixer 4 where it is mixed with a charge of butanol added through line 26. The mixed alumina-water portion and butanol are passed to settler 5 and allowed to separate. The butanol-water portion is withdrawn from settler 5 through line 18 and passed to mixer 2, and the water-alumina portion is withdrawn through line 30 and passed to filter 6. At filter 6 the alumina-water portion is separated into an aqueous-alumina filtercake containing about 16 weight percent $Al_2O_3$ and water. The water is routed to butanol recovery through line 34, and the aqueous-alumina slurry is passed to dryer 7 through line 32. Solvent from solvent storage 8 is passed to boiler 9 through line 36 and vaporized to produce a solvent vapor which is passed through line 38 to heater 10 where the solvent vapor is heated to produce a superheated solvent vapor. The superheated solvent vapor is passed through line 40 to dryer 7 where it is contacted with the aqueous-alumina filtercake to produce a dried alumina which is removed through line 42 and a solvent vapor containing water which is removed through line 44 and passed to solvent recovery 11. At solvent recovery 11 the solvent vapor is condensed and fractionated, the water is removed through line 48, and the solvent is returned to solvent storage through line 46.

The above illustration shows a typical embodiment of the process of the present invention and is not limiting, except as stated. In particular, the process of the present invention is shown in conjunction with the production of alumina by the hydrolysis of aluminum alkoxides for convenience, and while the alumina produced by the water hydrolysis of aluminum alkoxides is preferred, it should be clearly understood that the process of the present invention is not so limited. In particular, is is pointed out that all aqueous-alumina mixtures described above are suitable as starting materials in the process of the present invention.

The alumina produced by the method of the present invention has desirable properties for use as catalytic materials and the like. Typical properties are: a loose-bulk density from about 7.5 to about 25 $lb/ft^3$, a surface area from about 260 to about 400 $m^2/g$, and a pore volume of about 1.0 to about 2.75 cc/g. Preferred properties are a loose-bulk density from about 9 to about 15 $lb/ft^3$, a pore volume of from about 1.5 to about 2.75 cc/g, and a surface area from about 300 to about 400 $m^2/g$. Such alumina is very desirable for catalytic uses. A further desirable property is that a high proportion, typically more than 50% of the pore volume, consists of pores smaller than 1,000 A in diameter with a typical average pore diameter from about 80 to about 250 A. The term alumina as used herein refers to an apparently dry solid which may contain in addition to $Al_2O_3$, free water, water of hydration, and the like.

The alumina produced by the method of the present invention from aqueous-alumina mixtures produced by the hydrolysis of aluminum alkoxides has a further desirable property in that the alumina so produced is extrudable upon drying to an $Al_2O_3$ content greater than 85 weight percent with only a slight loss in desirable properties. A suitable extrusion process is shown in U.S. Ser. No. 286,246 entitled "Low-Density, High-Porosity Alumina Extrudates and a Method for Producing said Extrudates" filed July 3, 1972, by Leach, Hritz, and Royer. No satisfactory explanation for this unusual and unexpected property is now known.

In the practice of the present invention the aqueous-alumina mixture containing up to about 32 weight percent $Al_2O_3$ is dried using a solvent vapor selected from the vapors of alkanols containing from about 1 to about 8 carbon atoms and combinations thereof. Some specific examples of such solvents are methanol, ethanol, propanol, isopropanol, butanol, isobutanol, secondary butanol, tertiary butanol, pentanol-1, pentanol-2, pentanol-3, 2 methyl-butanol-4, 2 methyl-butanol-3, 2 methyl-butanol-2, 2,2 dimethyl propanol-1, 3 methyl-2-butanol, hexanol, heptanol, octanol, and the like. The aqueous alumina may be dried by contacting it with the alkanol vapor by methods commonly used in the art for intimately contacting solids, liquids, or slurries with a vapor. In other words, the vapor may be passed over thin layers of the alumina slurry, the vapor may be passed upwardly through an alumina slurry, the alumina-water mixture may be spray dried in alkanol vapor streams; and the like. Any method which contacts the aqueous-alumina mixture intimately with the solvent vapor is suitable. The aqueous-alumina mixtures at lower $Al_2O_3$ concentrations are liquids while at higher $Al_2O_3$ concentrations the mixtures are more similar to slurries or a wet sand cake. The aqueous-alumina mixture may be dried to about 90 weight percent $Al_2O_3$ by the use of the solvent vapor, although it is generally preferable to dry to no more than about 75 weight percent $Al_2O_3$. Further drying is difficult and tends to result in a high carbon build-up on the alumina product. Carbon build-up as used herein refers to residual organic material. It is also desirable that an external heat source be used since the heat transfer is low if all heat required for vaporization is supplied by the solvent vapor.

The solvent vapor may be at any desired temperature above the boiling temperature of the solvent at the pressure used. It is preferred, however, that the solvent vapor be preheated to avoid substantial condensation of the solvent in the aqueous-alumina mixture. This heating may be carried to any desired temperature so long as temperatures are not attained at which the solvent begins to decompose and form undesirable by-products. Desirably, the drying step is carried out at a temperature above the boiling point of the solvent to further minimize condensation of the alkanol vapors in the alumina-water mixture. Preferred operating ranges are up to about 500° F at atmospheric conditions. Of the solvents listed above, the alkanols containing from 2 to 6 carbon atoms are preferred. Of these, the alkanols containing from 2 to 4 carbon atoms, such as ethanol, n-propanol, isopropanol, n-butanol, secondary butanol, isobutanol, tertiary butanol, and combinations thereof are preferred, and particularly desirable results have been obtained wherein the vapors of ethanol or butanol were used. The use of these two solvents is particularly desirable since in many processes wherein alumina is produced butanol and ethanol are present as process streams.

While the alumina slurry may be dried to alumina containing as high as 70 to 75 percent $Al_2O_3$, a preferred modification of the present process is to dry to an alumina containing about 50 weight percent $Al_2O_3$ and thereafter complete the drying using superheated steam as shown more fully in U.S. Pat. No. 3,773,691 entitled "Removal of Residual Carbon Contaminants From Alumina," issued Nov. 20, 1973, to Bruce E. Leach. The use of steam is desirable for several reasons: the use of steam to complete the drying results in a substantially lower carbon residue on the product alumina, the use of steam is considerably more economical than the use of additional solvent vapor, and the steam requires no elaborate separation techniques for recovery.

Numerous process variations within the scope of the present invention may appear obvious or desirable to those skilled in the art based upon the foregoing descriptions of the preferred embodiments and the following examples and appended claims.

EXAMPLES

Alumina filtercake prepared by the water hydrolysis of aluminum alkoxides prepared by the Ziegler process and containing about 15.5 weight percent $Al_2O_3$, about 8 weight percent butanol, and about 76.5 weight percent water was used for the following tests.

The pore volumes shown in the following examples were determined by the mercury-penetration technique using pressures up to about 50,000 psig. The tests were performed on a Mercury Porisimeter, Model 905-1, manufactured by the Micromeritics Corporation of Norcross, Ga.

EXAMPLE I

The alumina filtercake was placed in a container fitted to allow passage of a solvent vapor through the alumina filtercake, and the solvent was placed in a vessel fitted with a stopper and connected to the alumina container. The apparatus was then placed in an oven and the solvent allowed to vaporize and pass through the alumina filtercake. Several solvents were tested. The test conditions and product alumina properties are shown below in Table I.

TABLE I

| Solvent | Control | Methanol | Ethanol | n-Butanol | n-Pentanol | n-Hexanol |
|---|---|---|---|---|---|---|
| Treatment Conditions | | | | | | |
| Filtercake (g) | 100 | 100 | 100 | 100 | 100 | 100 |
| Solvent (g) | — | 300 | 500 | 150 | 269 | 357 |
| Oven temperature ° F | 300 | 300 | 300 | 300 | 350 | 400 |
| Product Properties | | | | | | |
| [1]Carbon (wt %) | 0.30 | 1.04 | 1.41 | 6.55 | 15.0 | 15.2 |
| Loose bulk density ($lb/ft^3$) | 44.2 | 32.5 | 21.5 | 12.9 | 16.2 | 15.0 |
| $Al_2O_3$ Content (wt %) | 79.4 | 79.1 | 79.0 | 76.0 | 64.2 | 63.9 |
| [2]Surface area ($m^2/g$) | 223.4 | 310.0 | 320.9 | [3]329.0 | 360.6 | 373.8 |
| [2]Pore volume (cc/g) | 0.55 | 0.95 | 1.40 | 2.10 | 1.90 | 2.10 |

[1]Residual organic material reported as wt % carbon.
[2]After calcining at 900° F for 3 hours.
[3]After steaming in Example 2.

As clearly shown above, drying the aqueous-alumina filtercake with alkanol vapors is effective in reducing the loose-bulk density, increasing the surface area, and producing a high-quality alumina.

Methanol, while effective, is less effective than the other alcohols shown, and it is noted that with the heavier alcohols, i.e., above $C_4$, the carbon content is increased.

The value for $Al_2O_3$ content are apparently lower for the n-butanol, n-pentanol, and n-hexanol tests. Actually, the values are more comparable to the other tests than the values stated would indicate since the carbon content of these samples is higher than in the other tests. After correction to an $Al_2O_3$ content based on no carbon content, the values are n-butanol — 81.5 weight percent $Al_2O_3$, n-pentanol – 75.5 weight percent $Al_2O_3$, and n-hexanol – 75.5 weight percent $Al_2O_3$.

EXAMPLE II

A further test was performed using the alumina produced by drying with butanol vapor as shown in Example I wherein the product was thereafter further dried with 0.5 lbs of steam per pound of alumina at 300° F for 35 minutes. The carbon content was reduced from 6.55 to about 3.85, and the loose-bulk density was 12.7 lb/ft$^3$.

EXAMPLE III 111 grams of alumina filtercake was dried using 220 grams of butanol vapor at 300° F over a 3-hour period in the apparatus described in Example I. The product alumina was then further dried with 0.5 g of superheated steam per gram of alumina at 300° F for about 90 minutes. The alumina after steam contacting had an $Al_2O_3$ content of 73.2 weight percent, a surface area of 320 m$^2$/g. a loose-bulk density of 11.4 lb/ft$^3$, a pore volume of 2.25 cc/g, and a carbon content of 1.81 weight percent as compared to a carbon content of 3.86 weight percent prior to steam contacting. The pore volume distribution is shown below.

| Pore Diameter A | Cumulative Pore Volume cc/g |
|---|---|
| 0–35 | .0750 |
| 40 | .0750 |
| 50 | .1366 |
| 65 | .2159 |
| 80 | .4173 |
| 100 | .7586 |
| 120 | .8746 |
| 150 | .9732 |
| 200 | 1.0746 |
| 250 | 1.1409 |
| 350 | 1.2289 |
| 500 | 1.3186 |
| 800 | 1.4145 |
| 1000 | 1.4937 |
| 2000 | 1.6408 |
| 5000 | 1.9229 |
| 10000 | 2.2541 |

EXAMPLE IV 50 grams of alumina filtercake was dried using 158 grams of ethanol vapor at 250° F over a period of 4 hours in an apparatus similar to that used in Example I. The product alumina had an $Al_2O_3$ content of 79 weight percent $Al_2O_3$, a surface area of 322.9 m$^2$/g, a pore volume of 1.29 cc/g, a loose-bulk density of 21.6 lb/ft$^3$, and a carbon content of 0.91 weight percent. No steam was used. The pore volume distribution is shown below.

| Pore Diameter A | Cumulative Pore Distribution (cc/g) |
|---|---|
| 0–35 | .1046 |
| 40 | .1066 |
| 50 | .1685 |
| 65 | .5440 |
| 80 | .7057 |
| 100 | .7896 |
| 120 | .8236 |
| 150 | .8895 |
| 200 | .9294 |
| 250 | .9574 |
| 350 | .9713 |
| 500 | .9913 |
| 800 | 1.0253 |
| 1000 | 1.0532 |
| 2000 | 1.0931 |
| 5000 | 1.1750 |

-continued

| Pore Diameter A | Cumulative Pore Distribution (cc/g) |
|---|---|
| 10000 | 1.2909 |

As will be observed in Examples III and IV, desirable pore volumes and pore distributions are obtained with steam contacting or without. Steam is shown in Examples II and III to be effective in reducing the carbon residue without adversely affecting desirable alumina properties. As will be noted in Table I, the heavier alcohols tend to result in product alumina having higher carbon residues, however, this residue may be reduced by steam contacting as shown in Examples II and III.

Having thus described the invention we claim:

1. A method for producing low density, high porosity, high surface area alumina from an aqueous alumina mixture produced by the water hydrolysis of aluminum alkoxides and containing up to about 32 weight percent $Al_2O_3$, said method consisting essentially of drying said aqueous alumina mixture by contacting said aqueous alumina mixture with [an] *a superheated* alkanol vapor selected from the group consisting of [alkanols containing from 1 to 8 carbon atoms] *ethanol, propanol and isopropanol* and combinations thereof at a temperature to minimize condensation of said alkanol vapors in the aqueous alumina mixture in an amount sufficient to produce alumina containing at least about 50 weight percent $Al_2O_3$ and having a pore volume from about 1.0 to about 2.75 cc/g, a loose bulk density from about 7.5 to about [25] *21* lb/ft$^3$ and a surface area from about 260 to about 400 m$^2$/g, *and thereafter further drying said alumina with superheated steam.*

[2. The method of claim 1 wherein said aqueous alumina mixture is dried with an amount of said alkanol vapor sufficient to produce alumina containing at least about 50 weight percent $Al_2O_3$ and thereafter further dried with superheated steam thereby reducing the amount of residual carbon on the product alumina.]

3. The method of claim 1 wherein said aqueous alumina mixture contains from about 12 to about 22 weight percent $Al_2O_3$.

4. The method of claim 1 wherein said aluminum alkoxides have been produced by the Ziegler process.

5. The method of claim 1 wherein said recovered alumina has a pore volume from about 1.5 to about 2.75 cc/g, a loose bulk density from about 9 to about 15 lb/ft$^3$ and a surface area from about 300 to about 400 m$^2$/g.

[6. The method of claim 1 wherein said aqueous alumina mixture contains from about 12 to about 22 weight percent $Al_2O_3$, said alkanol vapor is butanol vapor and said recovered alumina has a pore volume from about 1.5 to about 2.75 cc/g, a loose bulk density from about 9 to about 15 lb/ft$^3$ and a surface area from about 300 to about 400 m$^2$/g.]

7. The method of claim 1 wherein said aqueous alumina mixture contains from about 12 to about 22 weight percent $Al_2O_3$ said alkanol vapor is ethanol vapor and said recovered alumina has a pore volume from about 1.5 to about 2.75 cc/g, a loose bulk density from about 9 to about 15 lb/ft$^3$ and a surface area from about 300 to about 400 m$^2$/g.

[8. The method of claim 1 wherein said alkanol vapor is selected from the group consisting of methanol, ethanol, n-propanol, isopropanol, n-butanol, isobutanol, pentanol-1, pentanol-2, pentanol-3, 2 methyl-butanol-4, 2 methyl-butanol-3, 2 methyl-butanol-2, 2,2, dimethyl propanol-1, secondary butanol, tertiary butanol, n-hexanol, n-heptanol, and n-octanol and combinations thereof.]

[9. The method of claim 8 wherein said alkanol vapor is selected from the group consisting alkanols containing from 2 to 6 carbon atoms and combinations thereof.]

[10. The method of claim 8 wherein said alkanol vapor is selected from the group consisting of ethanol, propanol, ispropanol, n-butanol, isobutanol, secondary butanol, tertiary butanol and combinations thereof.]

* * * * *

UNITED STATES PATENT OFFICE
CERTIFICATE OF CORRECTION

PATENT NO. : RE.29,605

DATED : April 4, 1978

INVENTOR(S) : Ziegenhain et al.

It is certified that error appears in the above-identified patent and that said Letters Patent are hereby corrected as shown below:

Column 2, line 6 - delete "objecting" and insert --objective--

Column 2, line 60 - delete "catalystic" and insert --catalytic--

Column 4, line 25 - delete "is" first occurrence and insert -- it --.

Column 4, line 34 - after "volume of" insert --from--

Signed and Sealed this

*Twenty-ninth* Day of *August 1978*

[SEAL]

*Attest:*

RUTH C. MASON
*Attesting Officer*

DONALD W. BANNER
*Commissioner of Patents and Trademarks*